United States Patent
Blehi, III

[11] Patent Number: 6,141,997
[45] Date of Patent: Nov. 7, 2000

[54] SEMITRAILER ANTITHEFT SYSTEM

[76] Inventor: Andrew Blehi, III, 65860 Hwy. 60 P.O. Box 522, Salome, Ariz. 85348

[21] Appl. No.: 09/168,212

[22] Filed: Oct. 7, 1998

[51] Int. Cl.[7] .............................. E05B 67/38; B60R 9/02
[52] U.S. Cl. .................................. 70/56; 70/237; 70/258; 70/190; 280/763.1
[58] Field of Search .......................... 70/184, 185, 186, 70/56, 34, 237, 258, 190; 280/763.1, 6.153, 475; 248/354.1, 352

[56] References Cited

U.S. PATENT DOCUMENTS

| | | | |
|---|---|---|---|
| 1,369,308 | 2/1921 | Taylor | 70/186 |
| 1,498,940 | 6/1924 | Wheeler . | |
| 4,042,202 | 8/1977 | Molinari . | |
| 5,172,574 | 12/1992 | Perfetto | 70/56 |
| 5,426,961 | 6/1995 | Rimbaud et al. | 70/237 |

FOREIGN PATENT DOCUMENTS

| | | | |
|---|---|---|---|
| 18814 | 3/1930 | Australia | 70/185 |
| 46 3048 | 4/1951 | Italy | 70/185 |

*Primary Examiner*—Darnell Boucher
*Attorney, Agent, or Firm*—Martin L. Stoneman

[57] ABSTRACT

A semitrailer antitheft system is described for use with a semitrailer landing gear of the type having a housing-enclosed gear train coupled to a telescoping lower strut. The antitheft system includes a non-rotatable shaft-mounted gear segment for engaging the gear on the stationary shaft of the existing gear train, thereby preventing unauthorized raising or lowering of the telescoping lower strut. A lock is provided on one end of the non-rotatable shaft to prevent unauthorized disengagement of the gear segment from the gear train. The antitheft system may be incorporated into an existing housing, if room permits, or the housing may be modified so as to provide for incorporation. Alternatively, the antitheft system may be provided as an add-on kit to be attached to the existing housing.

62 Claims, 5 Drawing Sheets

SEMITRAILER ANTITHEFT SYSTEM

BACKGROUND OF THE INVENTION

1. Field of the Invention

This invention relates to providing a semitrailer antitheft system. More particularly, this invention concerns a semitrailer antitheft system for mechanically locking the gear train of a semitrailer landing gear system, thereby preventing unauthorized movement of the semitrailer.

2. Description of the Prior Art

Typically, semitrailers (herein referred to as trailers) are used to transport goods over the open roads by attaching the trailer to semi truck (herein referred to as tractor). Upon delivering the goods to the desired destination, the trailers are either uncoupled from or remained coupled to the tractor. To facilitate the coupling and uncoupling of the tractor from the trailer, many trailers come equipped with jack-type devices which are known by such names as "landing gear" or "props" which are mounted on each side of and adjacent to the front end of the trailer. A typical landing gear system comprises a substantially enclosed gear train consisting of, in some cases, a drive gear mounted on a slidable shaft and a driven gear mounted on a stationary shaft. The stationary shaft is coupled, typically by a bevel gear, to a telescoping lower strut which, in turn, is slidably attached to a stationary upper strut member.

In operation, extension of the lower strut is accomplished by turning a lever arm or handle which is attached to the slidable shaft. The output torque from the slidable shaft-mounted drive gear is transferred to the stationary shaft-mounted driven gear which, in turn, causes rotation of the stationary shaft and a resulting vertical movement of the lower strut. Successive rotations of the handle causes a "foot", attached to the bottom of each lower strut, to come in contact with the ground. Any further rotations of the handle results in a raising of the upper end of the trailer. With the trailer being supported adjacent the front end of the trailer by the landing gear, the trailer's kingpin may then be disengaged from the tractor's swivel plate thereby allowing for the removal of the tractor. Upon re-coupling of the same or different tractor to the trailer, if the landing gear is not raised to a sufficient height above the ground level after coupling to the tractor, any attempts to move the trailer without raising the landing gear will result in the landing gear feet dragging noisily along the ground surface and striking any elevated protuberances in the road, thereby causing damage to the landing gear, the trailer, or both.

Due to the fact that trailers oftentimes contain large amounts of valuable cargo, unless the cargo contained in the trailer is immediately attended to, or the trailer is stored in a safe location, the trailer and its cargo make an appealing target to a would-be thief and are thus vulnerable to theft. Typical methods of stealing a trailer and its cargo include coupling a tractor to the uncoupled trailer, raising the landing gear, and towing the trailer away. If the tractor is coupled and left unattended, a thief may either steal the tractor-trailer combination or uncouple the original tractor from the trailer and replace it with the thieves tractor.

Applicant is aware of prior art attempts to incorporate locking devices into semitrailer landing gear units. For example, Rimbaud et al. U.S. Pat. No. 5,426,961 teaches the use of a keyed locking device attached to the interior of the gear train housing which incorporates a forked lever to catch and immobilize the drive gear/moveable shaft. Though this device may be adequate for its intended purpose, it is susceptible to being circumvented by using a large lever arm such as a pipe wrench to manually turn the transfer shaft connecting the two landing gear units.

Still another landing gear locking mechanisms is disclosed in Blakelock GB-A-1,565,542 which teaches a mechanical keyed lock mechanism attached to the interior upper portion of the upper strut member. Locking of the landing gear is accomplished by a key-activated retractable bar which is structured and arranged to engage a space between the gear teeth on a bevel gear mounted within the upper strut housing, thereby preventing movement of the lower strut member. Though this arrangement may also be adequate for its intended purpose, it is easily accessible and hence susceptible to tampering after removal of the upper strut housing cover plate.

Thus, there exists an unmet need for a method to safeguard a semitrailer and its contents that is both relatively impervious to circumvention and unauthorized tampering and simple and economical to use.

OBJECTS OF THE INVENTION

A primary object of the present invention is to fulfill the above-mentioned need by the provision of a semitrailer antitheft system. A further primary object of the present invention is to provide such a system which is efficient, inexpensive, easy to use, and easy to manufacture. In addition, it is a primary object of the present invention to provide such a system which is available as either an after-market kit or incorporated into the landing gear system during its manufacture. Other objects of this invention will become apparent with reference to the following invention descriptions.

SUMMARY OF THE INVENTION

According to a preferred embodiment of the present invention, this invention provides a semitrailer antitheft system for use with a trailer landing gear, comprising, in combination: an upper strut member; a moveable lower strut structured and arranged for slidable attachment to such upper strut member; a housing attached adjacent to such upper strut member, such housing having a front surface and a rear surface; a raising means, substantially enclosed within, and rotatably attached to, such housing and fixed in a translationally static relationship with such housing, for raising and lowering such moveable lower strut; and an engagement means for engaging such raising means; wherein such engagement means comprises a movement prevention means for substantially preventing rotational movement of such raising means; wherein such engagement means is structured and arranged for essentially preventing such lower moveable strut from movement with respect to such upper strut member when such raising means is engaged by such engagement means.

In addition, this invention provides such a semitrailer antitheft system wherein such engagement means comprises: a first bar member having a first end and a second end, such first bar member being structured and arranged for translational movement substantially within such housing; a jamming means, attached to such first bar member, for essentially preventing movement of such raising means; a blocking means, attached to such housing, for essentially blocking rotational movement of such first bar member; and a locking means, attached to such first bar member, for essentially preventing such translational movement of such first bar member when such locking means is attached to such first bar member. And, further, it provides such a semitrailer antitheft system wherein such raising means comprises an second bar member having a driven gear attached thereto, such driven gear having at least two drive gear teeth thereon defining a gap therebetween; also, it provides such a system wherein such jamming means comprises a gear having at least one jamming gear tooth thereon, such jamming gear tooth being structured and arranged to engage such gap, whereby such drive means is essentially prevented from rotational movement.

Additionally, it provides for such a semitrailer antitheft system wherein such blocking means comprises a front guide having a cylindrical front inner surface and having a beveled portion, such front guide defining a front hole in such front surface of such housing, such front hole being structured and arranged to allow for translational movement of such first end of such first bar member outside of such housing. And, it further provides such a system wherein such first end of such first bar member comprises a first beveled bar portion structured and arranged for engagement with such beveled portion of such front guide. And, further still, it provides for such a semitrailer antitheft system wherein such blocking means comprises a rear guide having a cylindrical rear inner surface and having a beveled portion, such rear guide defining a rear hole in such rear surface of such housing, such rear hole being structured and arranged to allow for translational movement of such second end of such first bar member outside of such housing. And, even further, it provides for such a semitrailer antitheft system wherein such second end of such first bar member comprises a second beveled bar portion structured and arranged for engagement with such beveled portion of such rear guide.

Further, this invention provides such a semitrailer antitheft system wherein such blocking means comprises: a front guide having a cylindrical front inner surface and having a beveled portion, such front guide defining a front hole in such front surface of such housing, such front hole being structured and arranged to allow for translational movement of such first end of such first bar member outside of such housing; and a rear guide having a cylindrical rear inner surface and having a beveled portion, such rear guide defining a rear hole in such rear surface of such housing, such rear hole being structured and arranged to allow for translational movement of such second end of such first bar member outside of such housing. And, it provides such a system wherein such first end of such first bar member comprises a beveled bar portion structured and arranged for engagement with such beveled portion of such front guide; and such second end of such first bar member comprises a second beveled bar portion structured and arranged for engagement with such beveled portion of such rear guide.

Further still, this invention provides such a semitrailer antitheft system wherein such first end of such first bar member is structured and arranged for slidable engagement with such front inner surface of such front guide; and such second end of such first bar member is structured and arranged for slidable engagement with such rear inner surface of such rear guide. And it provides such a semitrailer antitheft system wherein such locking means comprises a lock having a width and an outer circumference, such lock being structured and arranged for attachment to such first bar end adjacent to such front surface of such housing.

Also, it provides for such a system further comprising a lock guard attached to the front surface of such housing adjacent such outer circumference of such lock, such lock guard substantially spanning the width of such lock and separated from such outer circumference of such lock by a distance sufficient to permit clearance of a finger of a user. Furthermore, it provides such a semitrailer antitheft system wherein such lock comprises a shackleless keyed lock having a rear surface and a front surface, such rear surface having a cavity sized for receipt of such first bar end; and, further still, wherein such lock further comprises a tapered lock housing having a rear housing diameter and a front housing diameter, such rear housing diameter being greater than such front housing diameter.

Even further, in accordance with a preferred embodiment thereof, this invention provides a semitrailer antitheft system for use with a trailer landing gear, comprising, in combination: an upper strut member; a moveable lower strut structured and arranged for slidable attachment to such upper strut member; a housing attached to such upper strut member, such housing having a front surface and a rear surface; a first bar member having a first end and a second end, such first bar member structured and arranged for translational movement substantially within such housing; a front guide having a cylindrical front inner surface and having a beveled portion, such front guide defining a front hole in such front surface of such housing, such front hole being structured and arranged to allow for translational movement of such first end of such first bar member outside of such housing; a second bar member rotatably attached to such housing and having a driven gear attached thereon, such driven gear having at least two driven gear teeth thereon defining a gap therebetween; mounted on such first bar member, a jamming gear having at least one jamming gear tooth thereon, such jamming gear tooth structured and arranged to engage such gap whereby such driven gear is essentially prevented from rotational movement; and a lock having a width and an outer circumference, such lock being structured and arranged for attachment to such first end of such first bar member adjacent to such front surface of such housing; wherein such first end of such first bar member comprises a beveled first end portion structured and arranged for slidable engagement with such beveled portion of such front guide; wherein such first bar member is essentially prevented from translational movement with respect to such housing when such lock is attached to such first end of such first bar member.

In addition, this invention provides such a semitrailer antitheft system further comprising a rear guide having a cylindrical rear inner surface and having a beveled portion, such rear guide defining a rear hole in such rear surface of such housing, such rear hole being structured and arranged to allow for translational movement of such second end of such first bar member outside of such housing; and, further, wherein such second end of such first bar member comprises a second beveled bar portion structured and arranged for slidable engagement with such beveled portion of such rear guide. Also, this invention provides for such a semitrailer antitheft system further comprising a lock guard attached to the front surface of such housing adjacent such outer circumference of such lock, such lock guard substantially spanning the width of such lock and separated from such outer circumference of such lock by a distance sufficient to permit clearance of a finger of a user.

Additionally, this invention provides such a semitrailer antitheft system wherein such housing further comprises a side surface having a side surface opening. And, it further provides such a system wherein such engagement means comprises: a first bar member having a first end and a second end; a jamming means, attached to such first bar member, for essentially preventing movement of such raising means; a blocking means, slidably attached to such first bar member, for essentially blocking rotational movement of such first bar member; and a locking means for essentially preventing translational movement of such first bar member.

Further, this invention provides such a semitrailer antitheft system further comprising a cover means, structured and arranged for attachment to such side surface of such housing, for substantially enclosing such engagement means. And it provides such a semitrailer antitheft system wherein such cover means comprises a protective cover for protecting such engagement means from tampering, such protective cover comprising: a front cover plate; a rear cover plate, such rear cover plate separated from such first cover plate by a distance; attached to such front cover plate and such rear cover plate, a top portion structured and arranged to span such distance; and a substantially open bottom portion structured and arranged to lie atop such side surface opening.

And, still further, it provides such a semitrailer antitheft system wherein such raising means comprises a second bar member having a driven gear attached thereon, such driven gear having at least two driven gear teeth thereon defining a gap therebetween. Also, this invention provides for such a semitrailer antitheft system wherein such jamming means comprises a jamming gear having at least one jamming gear tooth thereon, such jamming gear tooth structured and arranged to engage such gap whereby such driven gear is essentially prevented from rotational movement; and, further, wherein such side surface opening of such housing is sized and arranged to allow penetration of such jamming gear tooth into such housing.

Even further, this invention provides such a semitrailer antitheft system wherein such blocking means comprises a front guide having a cylindrical front inner surface and having a beveled portion, such front guide defining a front hole in such front cover plate of such protective cover, such front hole being structured and arranged to allow for translational movement of such first end of such first bar member outside of such protective cover. And it provides for such a system wherein such first end of such first bar member comprises a first beveled bar portion structured and arranged for slidable engagement with such beveled portion of such front guide. In addition, this invention provides for a semitrailer antitheft system wherein such blocking means comprises a rear guide having a cylindrical rear inner surface and having a beveled portion, such rear guide defining a rear hole in such rear cover plate of such protective cover, such rear hole being structured and arranged to allow for translational movement of such second end of such first bar member outside of such protective cover. Additionally, it provides for such a semitrailer antitheft system wherein such second end of such first bar member comprises a second beveled bar portion structured and arranged for engagement with such beveled portion of such rear guide.

Yet further, this invention provides for such a semitrailer antitheft system wherein such blocking means comprises: a front guide having a cylindrical front inner surface and having a beveled portion, such front guide defining a front hole in such front cover plate of such protective cover, such front hole being structured and arranged to allow for translational movement of such first end of such first bar member outside of such protective cover; and a rear guide having a cylindrical rear inner surface and having a beveled portion, such rear guide defining a rear hole in such rear cover plate of such protective cover, such rear hole being structured and arranged to allow for translational movement of such second end of such first bar member outside of such protective cover. Yet additionally, it provides for such a semitrailer antitheft system wherein such first end of such first bar member comprises a beveled bar portion structured and arranged for engagement with such beveled portion of such front guide; and such second end of such first bar member comprises a second beveled bar portion structured and arranged for engagement with such beveled portion of such rear guide.

Further still, this invention provides for a semitrailer antitheft system wherein such first end of such first bar member is structured and arranged for slidable engagement with such front inner surface of such front guide; and such second end of such first bar member is structured and arranged for slidable engagement with such rear inner surface of such rear guide. And it provides for such a semitrailer antitheft system wherein such locking means comprises a lock having a width and an outer circumference, such lock being structured and arranged for attachment to such first bar end adjacent to such front cover plate.

Yet further still, it provides for such a semitrailer antitheft system further comprising a lock guard attached to the front cover plate adjacent such outer circumference of such lock, such lock guard substantially spanning the width of such lock and separated from such outer surface of such lock by a distance sufficient to permit clearance of a finger of a user. This invention further provides such a semitrailer antitheft system wherein such top portion of such protective cover is structured and arranged to extend substantially beyond such front cover plate for substantially the width of such lock. And, it further provides such a system wherein such lock comprises a shackleless keyed lock having a rear surface and a front surface, such rear surface having a cavity sized for receipt of such first bar end. Also, it provides such a semitrailer antitheft system wherein such lock further comprises a tapered lock housing having a rear housing diameter and a front housing diameter, such rear housing diameter being greater than such front housing diameter.

Yet even further, in accordance with a preferred embodiment thereof, this invention provides for a semitrailer antitheft system for use with a trailer landing gear, comprising, in combination: an upper strut member; a moveable lower strut structured and arranged for slidable attachment to such upper strut member; a housing attached adjacent to such upper strut member, such housing having a side surface having a side surface opening; a second bar portion rotatably attached to such housing and fixed in a translationally static relation with such housing, such second bar portion having a driven gear attached thereon having at least two driven gear teeth thereon defining a gap therebetween; a protective cover, such protective cover comprising: a front cover plate; a rear cover plate such rear cover plate separated from such first cover plate by a distance; attached to such front cover plate and such rear cover plate, a top portion structured and arranged to span such distance; and a substantially open bottom portion structured and arranged to lie atop such side surface opening; a first bar member having a first end and a second end, such first bar member structured and arranged for translational movement substantially within such protective cover; a front guide having a cylindrical front inner surface and having a beveled portion, such front guide defining a front hole in such front cover plate of such protective cover, such front hole being structured and arranged to allow for translational movement of such first end of such first bar member outside of such protective cover; a jamming gear, mounted on such first bar member and having at least one jamming gear tooth thereon, such jamming gear tooth being structured and arranged to engage such gap whereby such driven gear is essentially prevented from rotational movement; and a lock having a width and an outer circumference, such lock being structured and arranged for attachment to such first bar end adjacent to such front cover plate; wherein such first end of such first bar member comprises a beveled first end portion structured and arranged for slidable engagement with such beveled portion of such front guide; wherein such first bar member is essentially prevented from translational movement with respect to such protective cover when such lock is attached to such first end of such first bar member.

In addition, this invention provides for such a semitrailer antitheft system further comprising a rear guide having a cylindrical rear inner surface and having a beveled portion, such rear guide defining a rear hole in such rear cover plate of such protective cover, such rear hole being structured and arranged to allow for translational movement of such second end of such first bar member outside of such protective cover. And it provides such a system wherein such second end of such first bar member comprises a second beveled bar portion structured and arranged for slidable engagement with such beveled portion of such rear guide.

Additionally, the present invention provides for such a semitrailer antitheft system further comprising a lock guard attached to the front cover plate adjacent such outer circumference of such lock, such lock guard substantially spanning the width of such lock and separated from such outer surface of such lock by a distance sufficient to permit clearance of a finger of a user. And, further, it provides such a semitrailer antitheft system wherein such top portion of such protective cover is structured and arranged to extend substantially beyond such front cover plate for substantially the width of such lock.

Yet additionally, in accordance with a preferred embodiment thereof, this invention provides for a semitrailer antitheft system for use in preventing theft of a semitrailer, such semitrailer having attached thereon a landing gear comprising a lower strut slidably attached to an upper strut, a housing attached to such upper strut, such housing having a side surface and having a side surface opening, and substantially enclosed within such housing, a second bar member having a driven gear attached thereon comprising at least two driven gear teeth defining a gap therebetween, such semitrailer antitheft system comprising, in combination: an engagement means for engaging such second bar portion; and a cover means for substantially enclosing such engagement means, such cover means being structured and arranged for attachment to such housing; whereby such moveable lower strut is essentially prevented from movement when such driven gear is engaged by such engagement means.

Further, this invention provides for such a semitrailer antitheft system wherein such engagement means comprises: a first bar member having a first end and a second end; a jamming means, attached to such first bar member, for essentially preventing movement of such raising means; a blocking means, slidably attached to such first bar member, for essentially blocking rotational movement of such first bar member within such cover means; and a locking means for essentially preventing translational movement with respect to such cover means of such first bar member. And, further still, it provides such a semitrailer antitheft system wherein such cover means comprises a protective cover for protecting such engagement means from tampering, such protective cover comprising: a front cover plate; a rear cover plate, such rear cover plate separated from such first cover plate by a distance; attached to such front cover plate and such rear cover plate, a top portion structured and arranged to span such distance; and a substantially open bottom portion structured and arranged to lie atop such side surface opening.

Further still, this invention provides such a semitrailer antitheft system wherein such jamming means comprises a jamming gear having at least one jamming gear tooth thereon, such jamming gear tooth being structured and arranged to penetrate such side surface opening and engage such gap whereby such driven gear is essentially prevented from rotational movement. And it provides for such a semitrailer antitheft system wherein such blocking means comprises a front guide having a cylindrical front inner surface and having a beveled portion, such front guide defining a front hole in such front cover plate of such protective cover, such front hole being structured and arranged to allow for translational movement of such first end of such first bar member outside of such protective cover.

Yet further still, this invention provides such a semitrailer antitheft system wherein such first end of such first bar member comprises a first beveled bar portion structured and arranged for slidable engagement with such beveled portion of such front guide. And, even further, it provides for such a system wherein such blocking means comprises a rear guide having a cylindrical rear inner surface and having a beveled portion, such rear guide defining a rear hole in such rear cover plate of such protective cover, such rear hole being structured and arranged to allow for translational movement of such second end of such first bar member outside of such protective cover; and, additionally, wherein such second end of such first bar member comprises a second beveled bar portion structured and arranged for engagement with such beveled portion of such rear guide.

Yet additionally, this invention provides such a semitrailer antitheft system wherein such blocking means comprises: a front guide having a cylindrical front inner surface and having a beveled portion, such front guide defining a front hole in such front cover plate of such protective cover, such front hole being structured and arranged to allow for translational movement of such first end of such first bar member outside of such protective cover; and a rear guide having a cylindrical rear inner surface and having a beveled portion, such rear guide defining a rear hole in such rear cover plate of such protective cover, such rear hole being structured and arranged to allow for translational movement of such second end of such first bar member outside of such protective cover. It also provides such a semitrailer antitheft system wherein such first end of such first bar member comprises a beveled bar portion structured and arranged for engagement with such beveled portion of such front guide; and such second end of such first bar member comprises a second beveled bar portion structured and arranged for engagement with such beveled portion of such rear guide.

Additionally still, this invention provides such a semitrailer antitheft system wherein such first end of such first bar member is structured and arranged for slidable engagement with such front inner surface of such front guide; and such second end of such first bar member is structured and arranged for slidable engagement with such rear inner surface of such rear guide. And it provides such a semitrailer antitheft system wherein such locking means comprises a lock having a width and an outer circumference, such lock being structured and arranged for attachment to such first bar end adjacent to such front cover plate. It also provides such a semitrailer antitheft system further comprising a lock guard attached to the front cover plate adjacent such outer circumference of such lock, such lock guard substantially spanning the width of such lock and separated from such outer surface of such lock by a distance sufficient to permit clearance of a finger of a user.

Furthermore, this invention provides such a semitrailer antitheft system wherein such top portion of such protective cover is structured and arranged to extend substantially beyond such front cover plate for substantially the width of such lock; and, further, wherein such lock comprises a shackleless keyed lock having a rear surface and a front surface, such rear surface having a cavity sized for receipt of such first bar end; and, further still, wherein such lock further comprises a tapered lock housing having a rear housing diameter and a front housing diameter, such rear housing diameter being greater than such front housing diameter.

Yet additionally still, according to a preferred embodiment thereof, this invention provides a semitrailer antitheft system for use in preventing theft of a semitrailer, such semitrailer having attached thereon a landing gear comprising a lower strut slidably attached to an upper strut, a housing attached to such upper strut, such housing having a side surface and having a side surface opening, and substantially enclosed within such housing, an essentially cylindrical second bar member having a driven gear attached thereon comprising at least two driven gear teeth defining a gap therebetween, such semitrailer antitheft system comprising, in combination: a protective cover, such protective cover comprising: a front cover plate; a rear cover plate, such rear cover plate separated from such first cover plate by a distance; attached to such front cover plate and such rear cover plate, a top portion structured and arranged to span such distance; and a substantially open bottom portion structured and arranged to lie atop such side surface opening; a first bar member having a first end and a second end, such first bar member structured and arranged for translational movement substantially within such protective cover; a front guide having a cylindrical front inner surface having a beveled portion thereon, such front guide defining a front hole in such front cover plate of such protective cover, such front hole being structured and arranged to allow for translational movement of such first end of such first bar member outside of such protective cover; a jamming gear, mounted on such first bar member and having at least one jamming gear tooth thereon, such jamming gear tooth being structured and arranged to penetrate such side surface opening and engage such gap whereby such driven gear is essentially prevented from rotational movement; and a lock having a width and an outer circumference, such lock being structured and arranged for attachment to such first bar end adjacent to such front cover plate; wherein such first end of such first bar member comprises a beveled first end portion structured and arranged for slidable engagement with such beveled portion of such front guide; wherein such first bar member is essentially prevented from translational movement with respect to such cover means when such lock is attached to such first end of such first bar member.

Even further, this invention provides such a semitrailer antitheft system further comprises a rear guide having a cylindrical rear inner surface and having a beveled portion, such rear guide defining a rear hole in such rear cover plate of such protective cover, such rear hole being structured and arranged to allow for translational movement of such second end of such first bar member outside of such protective cover. And it provides such a system wherein such second end of such first bar member comprises a second beveled bar portion structured and arranged for slidable engagement with such beveled portion of such rear guide.

Further still, this invention provides such a semitrailer antitheft system further comprising a lock guard attached to the front cover plate adjacent such outer circumference of such lock, such lock guard substantially spanning the width of such lock and separated from such outer surface of such lock by a distance sufficient to permit clearance of a finger of a user. It also provides such a semitrailer antitheft system wherein such top portion of such protective cover is structured and arranged to extend substantially beyond such front cover plate for substantially the width of such lock.

DETAILED DESCRIPTION OF A PREFERRED EMBODIMENT AND THE BEST MODE OF PRACTICE

Figures 1, 2, 3:
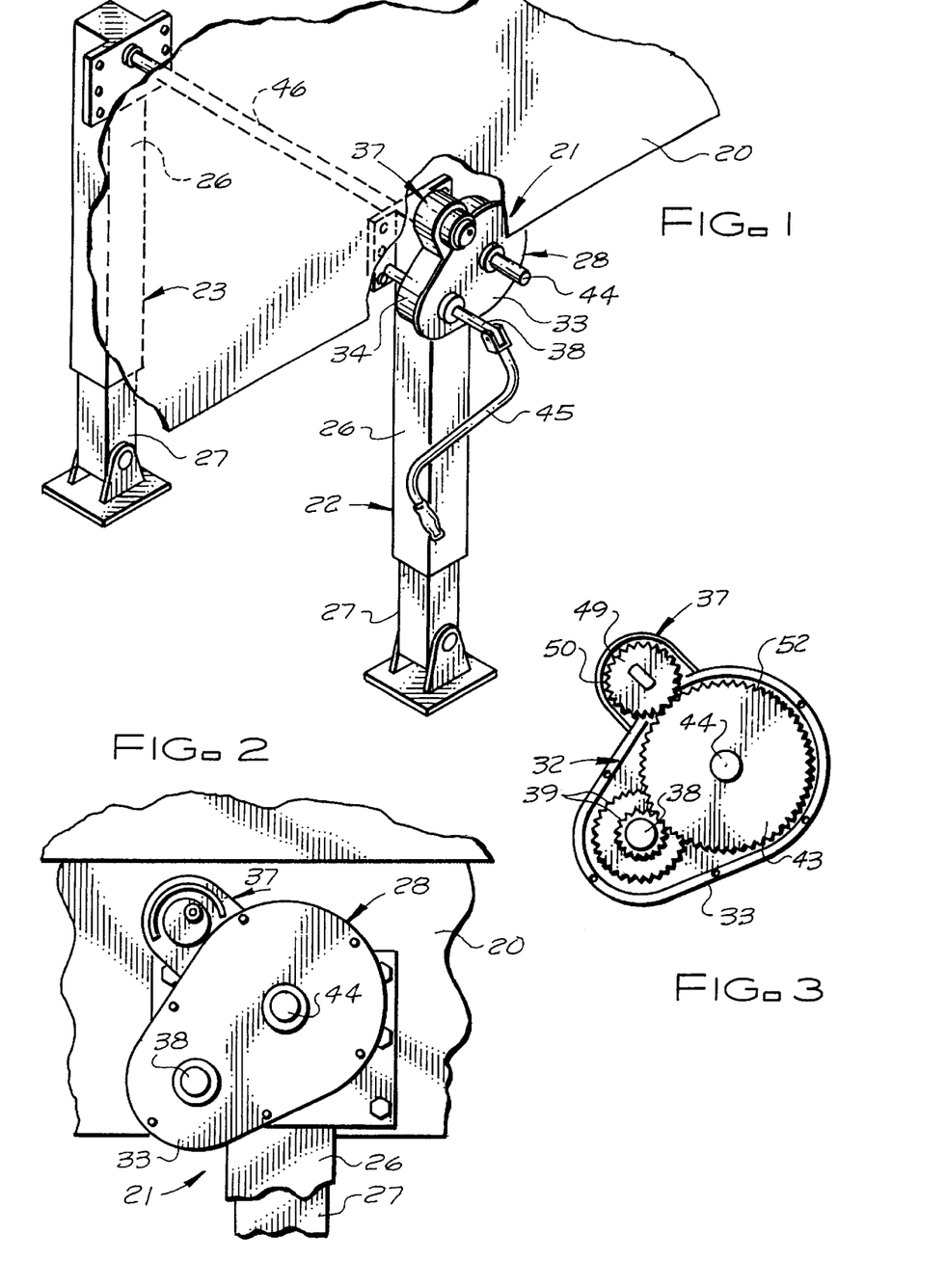
FIG. 1 is a perspective view of a portion of a semitrailer with attached landing gear incorporating the preferred embodiment of the of the semitrailer antitheft system.
FIG. 2 is a side elevation view of the semitrailer antitheft system attached to the landing gear.
FIG. 3 is a side elevation view illustrating the interrelationship between the semitrailer antitheft system and the gear train.

Referring now to the Figures, shown in perspective in FIG. 1 and in side elevation in FIG. 2 is a semitrailer 20 with an attached landing gear system 21. A typical landing gear system 21 consists of two units 22 and 23 which are structured and arranged for attachment to each side of the semitrailer 20. Each of units 22 and 23, in turn, consists of a stationary upper strut member 26 which is structured and arranged to house a telescoping lower strut 27. Attached to unit 22 is a gear box 28 comprising a gear train assembly 32 (shown best in FIG. 3) substantially enclosed by a gear train housing 33 which is typically attached to the upper strut member 26. Preferably attached to the gear train housing side surface 34 is a preferred embodiment of the semitrailer antitheft system 37 (herein referred to as antitheft system), the details of which will be more fully disclosed herein. The antitheft system 37 of the present invention is structured to substantially block movement of gear train assembly 32, thereby preventing unauthorized raising or lowering of each telescoping lower strut 27. In addition, the antitheft system 37 is structured and arranged to provide for convenient and easy access by the user, while making difficult unauthorized tampering and circumvention of the system.

Referring further to FIGS. 1 and 2, the gear train assembly 32 typically comprises a moveable drive shaft 38 on which is mounted at least one drive gear 39 (shown best in FIG. 3). Each drive gear 39 is arranged to alternatively engage not more than one corresponding driven gear 43 (shown best in FIG. 3) mounted on a stationary shaft 44. Raising and lowering of the telescoping lower strut 27 is accomplished by means of turning a lever arm or handle 45 which is pivotally attached to the moveable drive shaft 38. The moveable drive shaft 38 is structured and arranged for translational movement whereby the user may select a desired gear ratio by matching a drive gear 39 with a driven gear 43, thereby providing for a user choice of drive torques and crank speeds. The rotational movement of moveable drive shaft 38 caused by rotation of handle 45 is translated to stationary shaft 44. The stationary shaft 44 is mechanically coupled, typically by means of a bevel gear (not shown), to the telescoping lower strut 27. The combination of driven gear 43 and stationary shaft 44 embodies herein a raising means, substantially enclosed within, and rotatably attached to, such housing and fixed in a translationally static relationship with such housing, for raising and lowering such moveable lower strut. To permit the telescoping lower strut 27 of unit 23 to raise or lower in unison with unit 22, a transfer shaft 46 is mechanically coupled, typically with a beveled gear arrangement (not shown), to both units 22 and 23. Shown in FIG. 3 is the gear train assembly 32 as illustrated and described previously with respect to FIGS. 1 and 2. Also shown is the antitheft system 37 which is attached, preferably by welding, to the gear train housing 33. The antitheft system 37 comprises a shaft mounted jamming gear 49 having at least one jamming tooth 50 thereon. As will be more fully disclosed herein in conjunction with FIG. 4, when the antitheft system 37 is in a blocked position, at least one jamming tooth 50 of jamming gear 49 engages the gap 51 (shown best in FIG. 17) between two successive driven gear teeth 52, thereby effectively preventing the rotation of stationary shaft 44. Jamming gear 49 embodies herein a jamming means, attached to such first bar member, for essentially preventing movement of such raising means.

Figures 4, 5, 6:
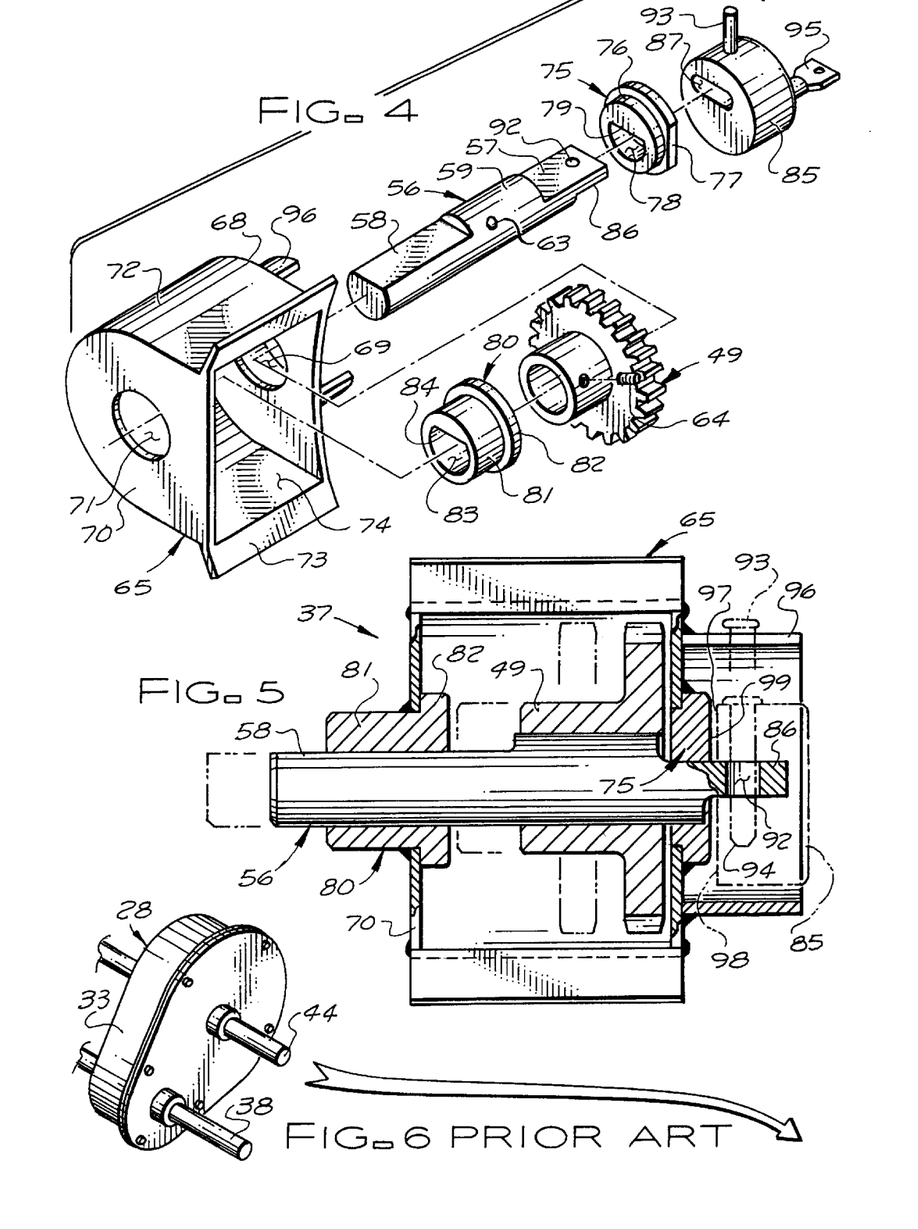
FIG. 4 is an exploded perspective view of the components of the semitrailer antitheft system.
FIG. 5 is a top view, partially in cross-section, illustrating the components of an assembled semitrailer antitheft system.
FIG. 6 is a perspective view illustrating an unmodified landing gear housing.

FIG. 4 is a perspective exploded view illustrating the various components comprising the antitheft system 37. Shown is a locking shaft 56 having a beveled first end portion 57, a beveled second end portion 58, and a substantially circular central portion 59 having a fastener recess 63 provided therein. Disposed upon the substantially circular central portion 59 of locking shaft 56 is jamming gear 49, which may be attached by engaging set-screw or drive pin 64 with the fastener recess 63. Substantially enclosing the locking shaft 56 and jamming gear 49 is a protective cover or jamming gear housing 65 comprising a front portion 68 having a front portion hole 69 therein, and a rear portion 70 having a rear portion hole 71 therein. The jamming gear housing 65 further comprises a cover portion 72 and a base portion 73 having a base opening 74 therein. The jamming gear housing 65 embodies herein a cover means, structured and arranged for attachment to such side surface of such housing, for substantially enclosing such engagement means.

Attached to the front portion 68, preferably by welding, is a front guide 75. In the preferred embodiment, the front guide 75 comprises a front sleeve portion 76 which is structured and arranged for concentric engagement with the front portion hole 69. The front guide 75 further comprises a front flanged portion 77 which is structured and arranged to abut the jamming gear housing 65, and a substantially cylindrical front guide inner surface 78 having a front beveled portion 79 thereon. In a similar manner, attached to the rear portion 70, preferably by welding, is a rear guide 80. In the preferred embodiment, the rear guide 80 comprises a rear sleeve portion 81 which is structured and arranged for concentric engagement with the rear portion hole 71. The rear guide 80 further comprises a rear flanged portion 82 which is structured and arranged to abut the jamming gear housing 65, and a substantially cylindrical rear guide inner surface 83 having a rear beveled portion 84 thereon.

In operation, the front guide 75 is structured and arranged for translational slidable engagement with the beveled first end portion 57 of locking shaft 56, and the rear guide 80 is structured and arranged for translational slidable engagement with the beveled second end portion 58 of locking shaft 56. This arrangement embodying herein an arrangement wherein such front guide defines a front hole in such front cover plate of such protective cover, such front hole being structured and arranged to allow for translational movement of such first end of such first bar member outside of such protective cover; and therein such rear guide defines a rear hole in such rear cover plate of such protective cover, such rear hole being structured and arranged to allow for translational movement of such second end of such first bar member outside of such protective cover. However, rotational movement of the locking shaft 56 is effectively prevented by the interaction of each respective beveled portion 79 and 84 with beveled end portions 57 and 58, respectively. This arrangement effectively prevents rotation of the stationary shaft 44 when the jamming gear 49 engages the driven gear 43 (as shown best in FIG. 10). Front guide 75 and rear guide 80 embody herein a blocking means, slidably attached to such first bar member, for essentially blocking rotational movement of such first bar member. It is to be understood that the use of guides 75 and 80 is exemplary only, and other methods may be used to block rotation of the blocking shaft 56 without deviating from the spirit of the present invention. Such other methods may include eliminating guides 75 and 80 and providing each respective hole 69 and 71 with a beveled portion.

Also shown in FIG. 4 is the use of a lock 85, preferably a shackleless keyed-lock of the type commercially available from Pacific Industries, Inc. (Woodland Hills, Calif.), which is used to prevent translational movement of the locking shaft 56 from a locked to an un-locked position. To facilitate attachment of the preferred lock 85 to the locking shaft 56, the beveled first end portion 57 of locking shaft 56 further comprises a shaft flattened portion 86 structured and arranged to engage lock cavity 87. Securing of the locking shaft 56 consists of inserting shaft flattened portion 86 into lock cavity 87 until pin hole 92 is in concentric alignment with the spring loaded lock pin 93. Depressing of lock pin 93 causes lock pin end 94 (see FIG. 5) to pass through pin hole 92. With the lock pin 93 in a depressed position, turning of key 95 results in the capture of lock pin end 94 thereby preventing translational movement of locking shaft 56. Removal of lock 85 (thereby allowing for unblocking of the driven gear 43) consists of turning of key 95 which causes the spring loaded lock pin 93 to return to an extended position, thereby releasing the shaft flattened portion 86. The lock 85 embodies herein a locking means, attached to such first bar member, for essentially preventing such translational movement of such first bar member when such locking means is attached to such first bar member. The combination described herein of the first bar member, jamming means, blocking means, and locking means embodies herein an engagement means for engaging such raising means; and wherein such engagement means comprises a movement prevention means for substantially preventing rotational movement of such raising means.

To prevent unauthorized access to the jamming gear 49 by tampering, it is recommended that the jamming gear housing 65 be constructed of a strong and durable material, preferably ⅛ inch mild steel. In addition, to prevent dislodging of lock 85 due to blows from a heavy instrument, e.g., a hammer, a lock guard 96 is attached, preferably by welding, to the front portion 68 of the jamming gear housing 65. As shown in FIG. 4, the lock guard 96 comprises a semi-circular structure, preferably made of ⅛ inch thick mild steel, having a width sufficient to substantially span the width of the attached lock 85. In addition, to facilitate removal of the lock 85 from locking shaft 56, the lock guard 96 preferably has a radius sufficient to allow passage of a user's fingers between the lock 85 and lock guard 96. Though applicant has described the preferred method of protecting lock 85, other methods, such as extending the cover portion 72 to substantially span the width of lock 85, may be used without deviating from the spirit of the present invention.

FIG. 5 shows a bottom plan view of the antitheft system 37 in both a locked and secured state and, in alternate detail, in an unlocked state. As a further precautionary measure, it is preferred that flattened portion 86 of locking shaft 56 be sized so that any gap 97 between the lock back surface 98 and the front guide front surface 99 be de minimis (preferably non-existent). This is necessary to prevent forceful removal of lock 85 by means of, say, a pry-bar or large screwdriver.

Figure 7:
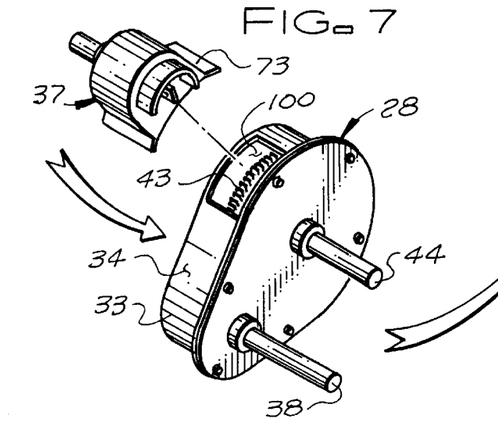
FIG. 7 is a perspective view illustrating the step of providing an opening in the landing gear housing.
Figure 8:
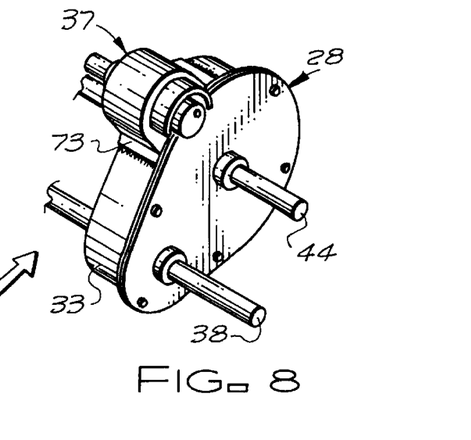
FIG. 8 is a perspective view illustrating the step of attaching the semitrailer antitheft system to the landing gear housing.

FIGS. 6 through 8 illustrate a preferred method of incorporating the antitheft system 37 to the gear box 28 of the preferred embodiment. FIG. 6 is representative of one such type gear box 28 which is commonly used and commercially available. As shown in FIG. 7, the first step consists of creating a side surface opening 100 in the side surface 34 of the existing gear train housing 33 so as to expose a portion of the driven gear 43, thereby allowing for unobstructed engagement of a jamming tooth 50 with the driven gear 43. This arrangement embodying herein an arrangement wherein such side surface opening of such housing is sized and arranged to allow penetration of such jamming gear tooth into such housing. Though it is preferred that the attachment location to the gear train housing 33 be substantially as illustrated, other suitable attachment locations adjacent to the driven gear 43 may be selected without deviating from the spirit of the present invention. As shown in FIG. 8, attachment of the antitheft system 37 to the gear train housing 33 consists of placing the base opening 74 (as shown best in FIG. 4) over the side surface opening 100 and attaching, preferably by welding, the base portion 73 to the gear train housing 33.

Figure 9:
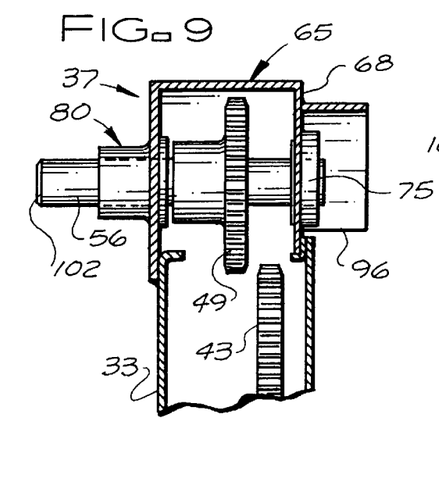
FIG. 9 is a side elevation view, in cross-section, illustrating the semitrailer antitheft system in an unlocked position.
Figure 10:
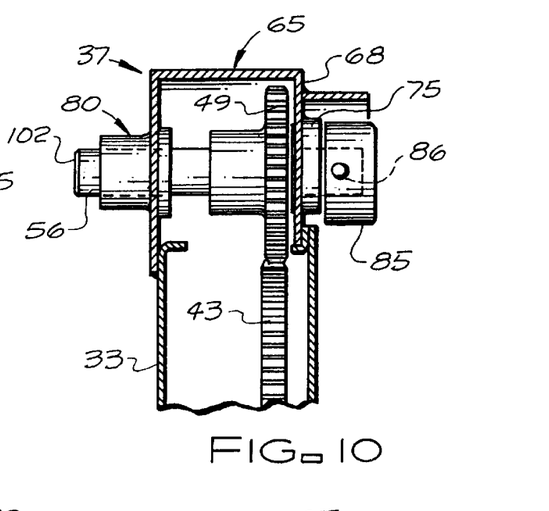
FIG. 10 is a side elevation view, in cross-section, illustrating the semitrailer antitheft system in a locked and secured position.

Shown in partial cross-section in FIGS. 9 and 10, are the antitheft system 37 in, respectively, the unlocked and locked position. Placing the antitheft system 37 in a locked position is accomplished by sliding the locking shaft 56 towards the front portion 68 of the jamming gear housing 65 until the jamming gear 49 engages the driven gear 43. The above-mentioned engaging of the jamming gear 49 with the driven gear 43 is preferably accomplished by manually pushing on the locking shaft rear face 102. The locking shaft 56 is sized and arranged so as to allow for proper attachment of the lock 85 when the jamming gear 49 is engaged with the driven gear 43. It is recommended that the user maintain pressure with locking shaft rear face 102 while installing the lock 85 so as to prevent the flattened portion 86 of the locking shaft 56 from being pushed into front guide 75.

Figure 11:
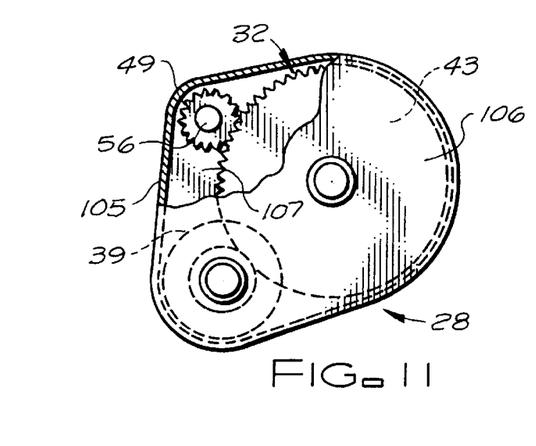
FIG. 11 is a side elevation view, in partial cut-away, of an alternate preferred embodiment of the semitrailer antitheft system incorporated inside a landing gear housing.
Figure 12:
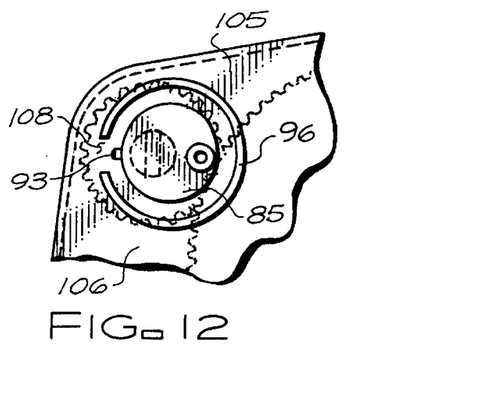
FIG. 12 is a partial side elevation view of the alternate preferred embodiment of FIG. 11 illustrating the external lock and lock guard.

FIGS. 11 and 12 illustrate an alternate preferred embodiment of the present invention. Shown is the commercially available gear train assembly 32 of the type illustrated and described herein with respect to FIGS. 1–10. In the present embodiment, a modified gear train housing 105 is manufactured during the construction of the gear box 28. The modified gear train housing 105 is sized to incorporate the shaft mounted drive gears 39, the shaft mounted driven gears 43, and the locking shaft 56 and jamming gear 49 combination previously illustrated and described. To prevent rotational movement of locking shaft 56, the present embodiment also incorporates a front guide 75 and a rear guide 80 of the type herein disclosed with respect to FIGS. 4 and 5. The front guide 75 and the rear guide 80 are attached, preferably by welding, to respectively the housing front portion 106 and the rear housing portion 107.

To prevent forceful removal of lock 85, a lock guard 96 is attached, preferably by welding, to the housing front portion 106. The lock guard 96 is structured and arranged to substantially encircle the lock 85. To allow the user to grasp the lock 85 so as to facilitate its removal and installation, the lock guard 96 preferably has a sufficiently large radius so as to allow for passage of the user's fingers between the lock 85 and lock guard 96. In addition, a guard gap 108 is provided so as to allow for unobstructed extension of lock pin 93.

Figure 13:
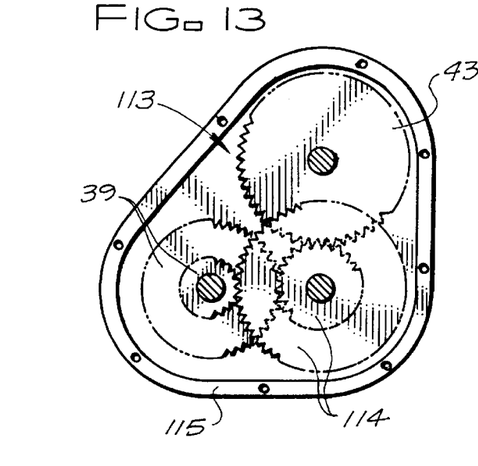
FIG. 13 is a side elevation view of yet another gear train arrangement.
Figure 14:
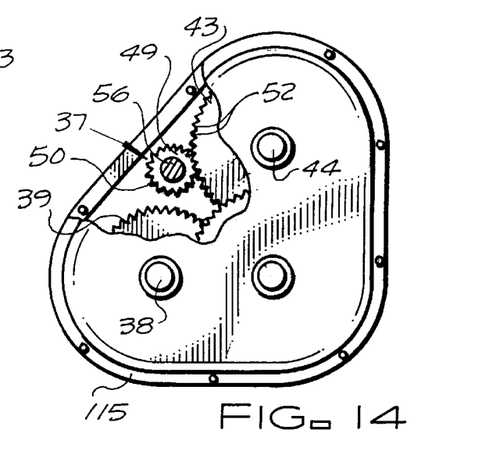
FIG. 14 is a side elevation view, in partial cut-away, of yet another preferred embodiment of the semitrailer antitheft system illustrating the antitheft system incorporated within the housing of the gear train arrangement of FIG. 13.

FIGS. 13–16 illustrate yet another alternate preferred embodiment of the present invention. Shown in FIG. 13 is yet another commercially available alternate gear train 113 arrangement in which a shaft mounted intermediate gear(s) 114 couples the moveable shaft mounted drive gear 39 to the stationary shaft mounted driven gear 43. Referring to FIG. 14, the antitheft system 37 of the present invention is shown installed within the alternate gear train housing 115. The alternate preferred embodiment of the present invention incorporates the use of a locking shaft 56 and jamming gear 49 combination of the type substantially as previously illustrated and described with respect to FIG. 4.

Figure 15:
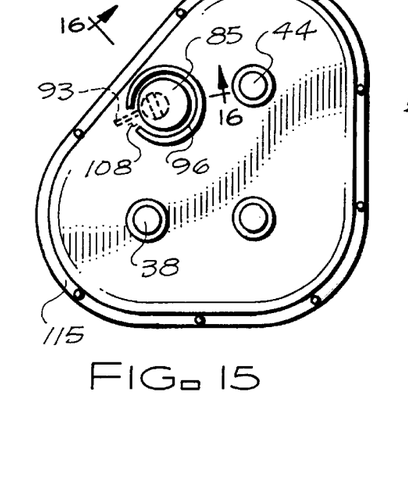
FIG. 15 is a side elevation view of the alternate preferred embodiment of FIG. 14 illustrating the external lock and lock guard.
Figure 16:
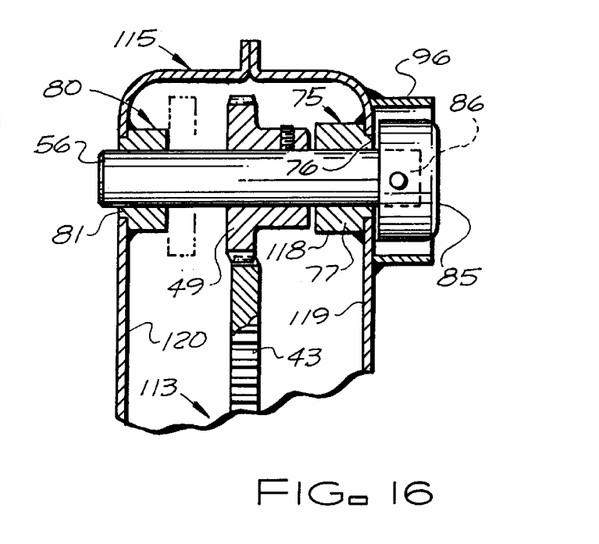
FIG. 16 is a side elevation view, in cross section, taken from section 16—16 in FIG. 15, illustrating the semitrailer antitheft system in a locked and secured position.

As in the previously disclosed preferred embodiments, the jamming gear 49 comprises at least one jamming tooth 50 which is structured and arranged to engage the gap 51 (as shown best in FIG. 17) between a pair of driven gear teeth 52, thereby placing the alternate gear train 113 arrangement in a locked condition. When the jamming gear 49 and the driven gear 43 are so engaged, the stationary shaft 44 is effectively prevented from rotational movement. To secure the antitheft system 37 in a locked position and thus prevent unauthorized unblocking of the driven gear 43, a lock 85, preferably a keyed lock of the type hereinbefore illustrated and described with respect to FIG. 4, is attached to the flattened portion 86 of locking shaft 56, as shown in FIGS. 15 and 16. To prevent forceful removal of lock 85, the alternate preferred embodiment also incorporates a lock guard 96 which is structured and arranged to substantially encircle the lock 85, as shown in FIG. 15. The lock guard 96 is attached, preferably by welding, to the alternate gear train housing 115 and is further provided with a guard gap 108 to allow for unobstructed extension of lock pin 93.

FIG. 16 is a partial cross section of the alternate gear train 113 arrangement illustrated and described previously in FIGS. 13–15. Specifically shown is the jamming gear 49 in both a locked and secured state and, in alternate detail, in an unlocked state. The jamming gear 49 and locking shaft 56 of the present alternate embodiment are as substantially illustrated and described hereinabove with respect to the previously disclosed embodiments. To prevent rotational movement of the locking shaft 56, the alternate preferred embodiment also incorporates a front guide 75 and a rear guide 80 as substantially hereinbefore illustrated and described. As shown in FIG. 16, it is preferred that front flanged portion 77 of front guide 75 be sized so as to abut the jamming gear front surface 118 when the jamming gear is in a locked position. Each guide 75 and 80 is attached, preferably by welding, to the alternate gear train housing 115. Front guide 75 and rear guide 80 embody herein a blocking means, attached to such housing, for essentially blocking rotational movement of such first bar member.

In the present alternate preferred embodiment, both the front guide 75 and the rear guide 80 comprise, respectively, a front sleeve portion 76 and a rear sleeve portion 81. To provide a rigid connection, the front sleeve portion 76 and the rear sleeve portion 81 are structured and arranged for concentric engagement with a pair of holes (not shown) formed in, respectively, the alternate gear train housing front portion 119 and alternate gear train housing rear portion 120. This arrangement embodying herein an arrangement wherein such front guide defines a front hole in such front surface of such housing, such front hole being structured and arranged to allow for translational movement of such first end of such first bar member outside of such housing; and such rear guide defines a rear hole in such rear surface of such housing, such rear hole being structured and arranged to allow for translational movement of such second end of such first bar member outside of such housing. It is to be understood that the use of guides 75 and 80 is exemplary only, and other methods may be used to block rotation of the blocking shaft 56 without deviating from the spirit of the present invention. Such other methods may include eliminating guides 75 and 80 and providing each respective hole (not shown) in the alternate gear train housing 115 with a beveled portion.

Figure 17:
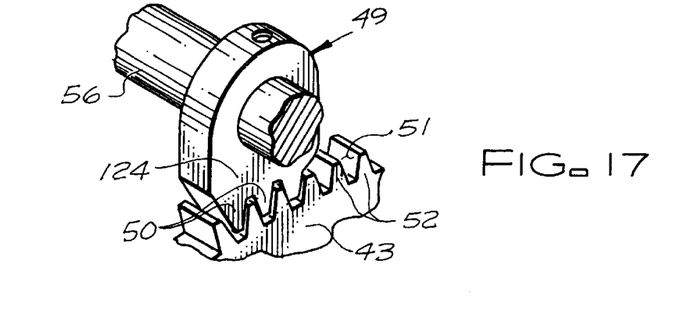
FIG. 17 is a perspective view of an alternate preferred embodiment of the jamming gear.

Shown in FIG. 17 is an alternate preferred embodiment of the jamming gear 49. Shown is the jamming gear 49 comprising a gear segment 124 structured and arranged to engage driven gear 43. As would be obvious to one skilled in such art, this arrangement provides for a more compact arrangement which would alleviate any size constraints when the jamming gear 49/locking shaft 56 is incorporated into an existing gear train housing. It is to be understood that even though the gear segment 124 is shown having more than one jamming tooth 50 thereon, the gear segment 124 may comprise a single jamming tooth 50 structured and arranged to engage the gap 51 between two successive driven gear teeth 52.

Figure 18:
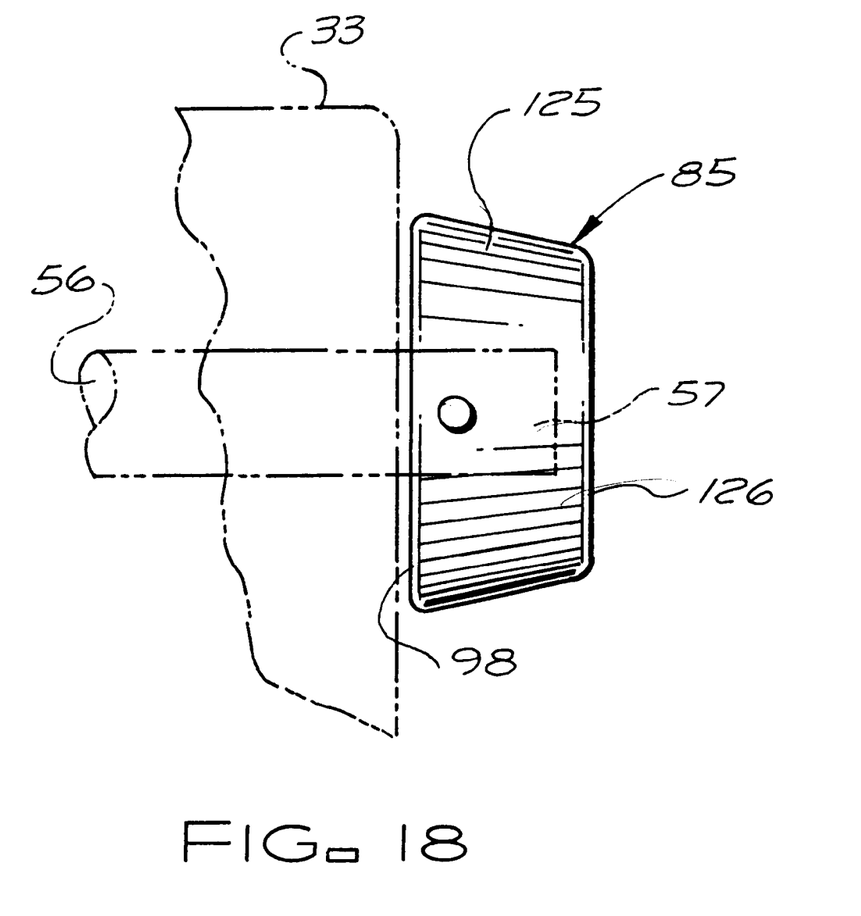
FIG. 18 is a left side elevation view of an alternate preferred embodiment of the lock.

FIG. 18 shows an alternate preferred embodiment of the lock 85 of the present invention. Shown is lock 85, preferably a shackleless-type lock as substantially described hereinabove, secured to the beveled first end portion 57 of blocking shaft 56. To prevent circumvention of the antitheft system 37 by such methods as using a wrench or other device to apply a torque to the lock 85, thereby breaking blocking shaft 56, the lock 85 is provided with a truncated-cone-shaped tapered housing 125. As shown, it is preferred that the tapered housing 125 have a greater diameter adjacent the lock back surface 98 than at the lock front surface 126. It has been found that by providing the lock 85 with a tapered housing 125, it is more difficult for a wrench to obtain a "bite" on the housing sufficient to apply a damaging torque. Though lock 85 is shown being practiced with gear train housing 33, such showing is exemplary only and it is to be understood that the present embodiment of lock 85 may be practiced with any of the antitheft system 37 embodiments described herein.

Although applicant has described applicant's preferred embodiments of this invention, it will be understood that the broadest scope of this invention includes such modifications as diverse shapes and sizes and materials. Such scope is limited only by the below claims as read in connection with the above specification. Further, many other advantages of applicant's invention will be apparent to those skilled in the art from the above descriptions and the below claims.

What is claimed is:

1. A semitrailer antitheft system for use with a trailer landing gear, comprising, in combination:
   (a) an upper strut member;
   (b) a moveable lower strut structured and arranged for slidable attachment to said upper strut member;
   (c) a housing attached adjacent to said upper strut member, said housing having a front surface and a rear surface;
   (d) a raising means, substantially enclosed within, and rotatable attached to, said housing and fixed in a translationally static relationship with said housing, for raising and lowering said moveable lower strut; and
   (e) an engagement means for engaging, substantially within said housing, said raising means;
   (f) wherein said engagement means comprises a movement prevention means for substantially preventing rotational movement of said raising means:
   (g) wherein said engagement means is structured and arranged for essentially preventing said lower moveable strut from movement with respect to said upper strut member when said raising means is engaged by said engagement means; and
   (h) wherein said engagement means comprises:
      (i) a first bar member having a first end and a second end, said first bar member being structured and arranged for translational movement substantially within said housing;
      (ii) a jamming means, attached to said first bar member, for essentially preventing movement of said raising means;
      (iii) a blocking means, attached to said housing, for essentially blocking rotational movement of said first bar member; and
      (iv) a locking means, attached to said first bar member, for essentially preventing said translational movement of said first bar member when said locking means' is attached to said first bar member.

2. A semitrailer antitheft system according to claim 1 wherein said raising means comprises an second bar member having a driven gear attached thereon, said driven gear having at least two drive gear teeth thereon defining a gap therebetween.

3. A semitrailer antitheft system according to claim 2 wherein said jamming means comprises a gear having at least one jamming gear tooth thereon, said jamming gear tooth being structured and arranged to engage said gap, whereby said drive means is essentially prevented from rotational movement.

4. A semitrailer antitheft system according to claim 1 wherein said blocking means comprises a front guide having a cylindrical front inner surface and having a beveled portion, said front guide defining a front hole in said front surface of said housing, said front hole being structured and arranged to allow for translational movement of said first end of said first bar member outside of said housing.

5. A semitrailer antitheft system according to claim 4 wherein said first end of said first bar member comprises a first beveled bar portion structured and arranged for engagement with said beveled portion of said front guide.

6. A semitrailer antitheft system according to claim 1 wherein said blocking means comprises a rear guide having a cylindrical rear inner surface and having a beveled portion, said rear guide defining a rear hole in said rear surface of said housing, said rear hole being structured and arranged to allow for translational movement of said second end of said first bar member outside of said housing.

7. A semitrailer antitheft system according to claim 6 wherein said second end of said first bar member comprises a second beveled bar portion structured and arranged for engagement with said beveled portion of said rear guide.

8. A semitrailer antitheft system according to claim 1 wherein said blocking means comprises:

(a) a front guide having a cylindrical front inner surface and having a beveled portion, said front guide defining a front hole in said front surface of said housing, said front hole being structured and arranged to allow for translational movement of said first end of said first bar member outside of said housing; and (b) a rear guide having a cylindrical rear inner surface and having a beveled portion, said rear guide defining a rear hole in said rear surface of said housing, said rear hole being structured and arranged to allow for translational movement of said second end of said first bar member outside of said housing.

9. A semitrailer antitheft system according to claim 8 wherein (a) said first end of said first bar member comprises a beveled bar portion structured and arranged for engagement with said beveled portion of said front guide; and (b) said second end of said first bar member comprises a second beveled bar portion structured and arranged for engagement with said beveled portion of said rear guide.

10. A semitrailer antitheft system according to claim 9 wherein (a) said first end of said first bar member is structured and arranged for slidable engagement with said front inner surface of said front guide; and (b) said second end of said first bar member is structured and arranged for slidable engagement with said rear inner surface of said rear guide.

11. A semitrailer antitheft system according to claim 1 wherein said locking means comprises a lock having a width and an outer circumference, said lock being structured and arranged for attachment to said first bar end adjacent to said front surface of said housing.

12. A semitrailer antitheft system according to claim 11 further comprising a lock guard attached to the front surface of said housing adjacent said outer circumference of said lock, said lock guard substantially spanning the width of said lock and separated from said outer circumference of said lock by a distance sufficient to permit clearance of a finger of a user.

13. A semitrailer antitheft system according to claim 11 wherein said lock comprises a shackleless keyed lock having a rear surface and a front surface, said rear surface having a cavity sized for receipt of said first bar end.

14. A semitrailer antitheft system according to claim 13 wherein said lock further comprises a tapered lock housing having a rear housing diameter and a front housing diameter, said rear housing diameter being greater than said front housing diameter.

15. A semitrailer antitheft system for use with a trailer landing gear, comprising, in combination:

(a) an upper strut member;

(b) a moveable lower strut structured and arranged for slidable attachment to said upper strut member;

(c) a housing attached to said upper strut member, said housing having a front surface and a rear surface;

(d) a first bar member having a first end and a second end, said first bar member structured and arranged for translational movement substantially within said housing;

(e) a front guide having a cylindrical front inner surface and having a beveled portion, said front guide defining a front hole in said front surface of said housing, said front hole being structured and arranged to allow for translational movement of said first end of said first bar member outside of said housing;

(f) a second bar member rotatably attached to said housing and having a driven gear attached thereon, said driven gear having at least two driven gear teeth thereon defining a gap therebetween;

(g) mounted on said first bar member, a jamming gear having at least one jamming gear tooth thereon, said jamming gear tooth structured and arranged to engage said gap whereby said driven gear is essentially prevented from rotational movement; and (h) a lock having a width and an outer circumference, said lock being structured and arranged for attachment to said first end of said first bar member adjacent to said front surface of said housing;

(i) wherein said first end of said first bar member comprises a beveled first end portion structured and arranged for slidable engagement with said beveled portion of said front guide;

(j) wherein said first bar member is essentially prevented from translational movement with respect to said housing when said lock is attached to said first end of said first bar member.

16. A semitrailer antitheft system according to claim 15 further comprising a rear guide having a cylindrical rear inner surface and having a beveled portion, said rear guide defining a rear hole in said rear surface of said housing, said rear hole being structured and arranged to allow for translational movement of said second end of said first bar member outside of said housing.

17. A semitrailer antitheft system according to claim 16 wherein said second end of said first bar member comprises a second beveled bar portion structured and arranged for slidable engagement with said beveled portion of said rear guide.

18. A semitrailer antitheft system according to claim 15 further comprising a lock guard attached to the front surface of said housing adjacent said outer circumference of said lock, said lock guard substantially spanning the width of said lock and separated from said outer circumference of said lock by a distance sufficient to permit clearance of a finger of a user.

19. A semitrailer antitheft system according to claim 1 wherein said housing further comprises a side surface having a side surface opening.

20. A semitrailer antitheft system according to claim 19 wherein said engagement means comprises:
   (a) a first bar member having a first end and a second end;
   (b) a jamming means, attached to said first bar member, for essentially preventing movement of said raising means;
   (c) a blocking means, slidably attached to said first bar member, for essentially blocking rotational movement of said first bar member; and
   (d) a locking means for essentially preventing translational movement of said first bar member.

21. A semitrailer antitheft system according to claim 20 further comprising a cover means, structured and arranged for attachment to said side surface of said housing, for substantially enclosing said engagement means.

22. A semitrailer antitheft system according to claim 21 wherein said cover means comprises a protective cover for protecting said engagement means from tampering, said protective cover comprising:
   (a) a front cover plate;
   (b) a rear cover plate, said rear cover plate separated from said first cover plate by a distance;
   (c) attached to said front cover plate and said rear cover plate, a top portion structured and arranged to span said distance; and
   (d) a substantially open bottom portion structured and arranged to lie atop said side surface opening.

23. A semitrailer antitheft system according to claim 19 wherein said raising means comprises a second bar member having a driven gear attached thereon, said driven gear having at least two driven gear teeth thereon defining a gap therebetween.

24. A semitrailer antitheft system according to claim 23 wherein said jamming means comprises a jamming gear having at least one jamming gear tooth thereon, said jamming gear tooth structured and arranged to engage said gap whereby said driven gear is essentially prevented from rotational movement.

25. A semitrailer antitheft system according to claim 24 wherein said side surface opening of said housing is sized and arranged to allow penetration of said jamming gear tooth into said housing.

26. A semitrailer anti-theft system according to claim 22 wherein said blocking means comprises a front guide having a cylindrical front inner surface and having a beveled portion, said front guide defining a front hole in said front cover plate of said protective cover, said front hole being structured and arranged to allow for translational movement of said first end of said first bar member outside of said protective cover.

27. A semitrailer antitheft system according to claim 26 wherein said first end of said first bar member comprises a first beveled bar portion structured and arranged for slidable engagement with said beveled portion of said front guide.

28. A semitrailer antitheft system according to claim 22 wherein said blocking means comprises a rear guide having a cylindrical rear inner surface and having a beveled portion, said rear guide defining a rear hole in said rear cover plate of said protective cover, said rear hole being structured and arranged to allow for translational movement of said second end of said first bar member outside of said protective cover.

29. A semitrailer antitheft system according to claim 28 wherein said second end of said first bar member comprises a second beveled bar portion structured and arranged for engagement with said beveled portion of said rear guide.

30. A semitrailer antitheft system according to claim 22 wherein said blocking means comprises:
   (a) a front guide having a cylindrical front inner surface and having a beveled portion, said front guide defining a front hole in said front cover plate of said protective cover, said front hole being structured and arranged to allow for translational movement of said first end of said first bar member outside of said protective cover; and
   (b) a rear guide having a cylindrical rear inner surface and having a beveled portion, said rear guide defining a rear hole in said rear cover plate of said protective cover, said rear hole being structured and arranged to allow for translational movement of said second end of said first bar member outside of said protective cover.

31. A semitrailer antitheft system according to claim 30 wherein
   (a) said first end of said first bar member comprises a beveled bar portion structured and arranged for engagement with said beveled portion of said front guide; and
   (b) said second end of said first bar member comprises a second beveled bar portion structured and arranged for engagement with said beveled portion of said rear guide.

32. A semitrailer antitheft system according to claim 31 wherein
   (a) said first end of said first bar member is structured and arranged for slidable engagement with said front inner surface of said front guide; and
   (b) said second end of said first bar member is structured and arranged for slidable engagement with said rear inner surface of said rear guide.

33. A semitrailer antitheft system according to claim 22 wherein said locking means comprises a lock having a width and an outer circumference, said lock being structured and arranged for attachment to said first bar end adjacent to said front cover plate.

34. A semitrailer antitheft system according to claim 33 further comprising a lock guard attached to the front cover plate adjacent said outer circumference of said lock, said lock guard substantially spanning the width of said lock and separated from said outer surface of said lock by a distance sufficient to permit clearance of a finger of a user.

35. A semitrailer antitheft system according to claim 33 wherein said top portion of said protective cover is structured and arranged to extend substantially beyond said front cover plate for substantially the width of said lock.

36. A semitrailer antitheft system according to claim 33 wherein said lock comprises a shackleless keyed lock having a rear surface and a front surface, said rear surface having a cavity sized for receipt of said first bar end.

37. A semitrailer antitheft system according to claim 36 wherein said lock further comprises a tapered lock housing having a rear housing diameter and a front housing diameter, said rear housing diameter being greater than said front housing diameter.

38. A semitrailer antitheft system for use with a trailer landing gear, comprising, in combination:
(a) an upper strut member;
(b) a moveable lower strut structured and arranged for slidable attachment to said upper strut member;
(c) a housing attached adjacent to said upper strut member, said housing having a side surface having a side surface opening;
(d) a second bar portion rotatably attached to said housing and fixed in a translationally static relation with said housing, said second bar portion having a driven gear attached thereon having at least two driven gear teeth thereon defining a gap therebetween;
(e) a protective cover, said protective cover comprising:
  (i) a front cover plate;
  (ii) a rear cover plate said rear cover plate separated from said first cover plate by a distance;
  (iii) attached to said front cover plate and said rear cover plate, a top portion structured and arranged to span said distance; and
  (iv) a substantially open bottom portion structured and arranged to lie atop said side surface opening;
(f) a first bar member having a first end and a second end, said first bar member structured and arranged for translational movement substantially within said protective cover;
(g) a front guide having a cylindrical front inner surface and having a beveled portion, said front guide defining a front hole in said front cover plate of said protective cover, said front hole being structured and arranged to allow for translational movement of said first end of said first bar member outside of said protective cover;
(h) a jamming gear, mounted on said first bar member and having at least one jamming gear tooth thereon, said jamming gear tooth being structured and arranged to engage said gap whereby said driven gear is essentially prevented from rotational movement; and
(i) a lock having a width and an outer circumference, said lock being structured and arranged for attachment to said first bar end adjacent to said front cover plate;
(j) wherein said first end of said first bar member comprises a beveled first end portion structured and arranged for slidable engagement with said beveled portion of said front guide;
(k) wherein said first bar member is essentially prevented from translational movement with respect to said protective cover when said lock is attached to said first end of said first bar member.

39. A semitrailer antitheft system according to claim 38 further comprising a rear guide having a cylindrical rear inner surface and having a beveled portion, said rear guide defining a rear hole in said rear cover plate of said protective cover, said rear hole being structured and arranged to allow for translational movement of said second end of said first bar member outside of said protective cover.

40. A semitrailer antitheft system according to claim 39 wherein said second end of said first bar member comprises a second beveled bar portion structured and arranged for slidable engagement with said beveled portion of said rear guide.

41. A semitrailer antitheft system according to claim 38 further comprising a lock guard attached to the front cover plate adjacent said outer circumference of said lock, said lock guard substantially spanning the width of said lock and separated from said outer surface of said lock by a distance sufficient to permit clearance of a finger of a user.

42. A semitrailer antitheft system according to claim 38 wherein said top portion of said protective cover is structured and arranged to extend substantially beyond said front cover plate for substantially the width of said lock.

43. A semitrailer antitheft system for use in preventing theft of a semitrailer, said semitrailer having attached thereon a landing gear comprising a lower strut slidably attached to an upper strut, a housing attached to said upper strut, said housing having a side surface and having a side surface opening, and substantially enclosed within said housing, a second bar member having a driven tear attached thereon comprising at least two driven gear teeth defining a gap therebetween, said semitrailer antitheft system comprising, in combination:
(a) an engagement means for engaging said second bar portion; and
(b) a cover means for substantially enclosing said engagement means, said cover means being structured and arranged for attachment to said housing;
(c) whereby said moveable lower strut is essentially prevented from movement when said driven gear is engaged by said engagement means; and
(d) wherein said engagement means comprises:
  (i) a first bar member having a first end and a second end;
  (ii) a jamming means, attached to said first bar member, for essentially preventing movement of said raising means;
  (iii) a blocking means, slidably attached to said first bar member, for essentially blocking rotational movement of said first bar member within said cover means; and
  (iv) a locking means for essentially preventing translational movement with respect to said cover means of said first bar member.

44. A semitrailer antitheft system according to claim 43 wherein said cover means comprises a protective cover for protecting said engagement means from tampering, said protective cover comprising:
(a) a front cover plate;
(b) a rear cover plate, said rear cover plate separated from said first cover plate by a distance;
(c) attached to said front cover plate and said rear cover plate, a top portion structured and arranged to span said distance; and
(d) a substantially open bottom portion structured and arranged to lie atop said side surface opening.

45. A semitrailer antitheft system according to claim 43 wherein said jamming means comprises a jamming gear having at least one jamming gear tooth thereon, said jamming gear tooth being structured and arranged to penetrate said side surface opening and engage said gap whereby said driven gear is essentially prevented from rotational movement.

46. A semitrailer antitheft system according to claim 44 wherein said blocking means comprises a front guide having a cylindrical front inner surface and having a beveled portion, said front guide defining a front hole in said front cover plate of said protective cover, said front hole being structured and arranged to allow for translational movement of said first end of said first bar member outside of said protective cover.

47. A semitrailer antitheft system according to claim 46 wherein said first end of said first bar member comprises a first beveled bar portion structured and arranged for slidable engagement with said beveled portion of said front guide.

48. A semitrailer antitheft system according to claim 44 wherein said blocking means comprises a rear guide having a cylindrical rear inner surface and having a beveled portion, said rear guide defining a rear hole in said rear cover plate of said protective cover, said rear hole being structured and arranged to allow for translational movement of said second end of said first bar member outside of said protective cover.

49. A semitrailer antitheft system according to claim 48 wherein said second end of said first bar member comprises a second beveled bar portion structured and arranged for engagement with said beveled portion of said rear guide.

50. A semitrailer antitheft system according to claim 44 wherein said blocking means comprises:
    (a) a front guide having a cylindrical front inner surface and having a beveled portion, said front guide defining a front hole in said front cover plate of said protective cover, said front hole being structured and arranged to allow for translational movement of said first end of said first bar member outside of said protective cover; and
    (b) a rear guide having a cylindrical rear inner surface and having a beveled portion, said rear guide defining a rear hole in said rear cover plate of said protective cover, said rear hole being structured and arranged to allow for translational movement of said second end of said first bar member outside of said protective cover.

51. A semitrailer antitheft system according to claim 50 wherein
    (a) said first end of said first bar member comprises a beveled bar portion structured and arranged for engagement with said beveled portion of said front guide; and
    (b) said second end of said first bar member comprises a second beveled bar portion structured and arranged for engagement with said beveled portion of said rear guide.

52. A semitrailer antitheft system according to claim 51 wherein
    (a) said first end of said first bar member is structured and arranged for slidable engagement with said front inner surface of said front guide; and
    (b) said second end of said first bar member is structured and arranged for slidable engagement with said rear inner surface of said rear guide.

53. A semitrailer antitheft system according to claim 44 wherein said locking means comprises a lock having a width and an outer circumference, said lock being structured and arranged for attachment to said first bar end adjacent to said front cover plate.

54. A semitrailer antitheft system according to claim 53 further comprising a lock guard attached to the front cover plate adjacent said outer circumference of said lock, said lock guard substantially spanning the width of said lock and separated from said outer surface of said lock by a distance sufficient to permit clearance of a finger of a user.

55. A semitrailer antitheft system according to claim 53 wherein said top portion of said protective cover is structured and arranged to extend substantially beyond said front cover plate for substantially the width of said lock.

56. A semitrailer antitheft system according to claim 53 wherein said lock comprises a shackleless keyed lock having a rear surface and a front surface, said rear surface having a cavity sized for receipt of said first bar end.

57. A semitrailer antitheft system according to claim 56 wherein said lock further comprises a tapered lock housing having a rear housing diameter and a front housing diameter, said rear housing diameter being greater than said front using diameter.

58. A semitrailer antitheft system for use in preventing theft of a semitrailer, said semitrailer having attached thereon a landing gear comprising a lower strut slidably attached to an upper strut, a housing attached to said upper strut, said housing having a side surface and having a side surface opening, and substantially enclosed within said housing, an essentially cylindrical second bar member having a driven gear attached thereon comprising at least two driven gear teeth defining a gap therebetween, said semitrailer antitheft system comprising, in combination:
    (a) a protective cover, said protective cover comprising:
        (i) a front cover plate;
        (ii) a rear cover plate, said rear cover plate separated from said first cover plate by a distance;
        (iii) attached to said front cover plate and said rear cover plate, a top portion structured and arranged to span said distance; and
        (iv) a substantially open bottom portion structured and arranged to lie atop said side surface opening;
    (b) a first bar member having a first end and a second end, said first bar member structured and arranged for translational movement substantially within said protective cover;
    (c) a front guide having a cylindrical front inner surface having a beveled portion thereon, said front guide defining a front hole in said front cover plate of said protective cover, said front hole being structured and arranged to allow for translational movement of said first end of said first bar member outside of said protective cover;
    (d) a jamming gear, mounted on said first bar member and having at least one jamming gear tooth thereon, said jamming gear tooth being structured and arranged to penetrate said side surface opening and engage said gap whereby said driven gear is essentially prevented from rotational movement; and
    (e) a lock having a width and an outer circumference, said lock being structured and arranged for attachment to said first bar end adjacent to said front cover plate;
    (f) wherein said first end of said first bar member comprises a beveled first end portion structured and arranged for slidable engagement with said beveled portion of said front guide;
    (g) wherein said first bar member is essentially prevented from translational movement with respect to said cover means when said lock is attached to said first end of said first bar member.

59. A semitrailer antitheft system according to claim 60 further comprises a rear guide having a cylindrical rear inner surface and having a beveled portion, said rear guide defining a rear hole in said rear cover plate of said protective cover, said rear hole being structured and arranged to allow for translational movement of said second end of said first bar member outside of said protective cover.

60. A semitrailer antitheft system according to claim 59 wherein said second end of said first bar member comprises a second beveled bar portion structured and arranged for slidable engagement with said beveled portion of said rear guide.

61. A semitrailer antitheft system according to claim 58 further comprising a lock guard attached to the front cover plate adjacent said outer circumference of said lock, said lock guard substantially spanning the width of said lock and separated from said outer surface of said lock by a distance sufficient to permit clearance of a finger of a user.

62. A semitrailer antitheft system according to claim 58 wherein said top portion of said protective cover is structured and arranged to extend substantially beyond said front cover plate for substantially the width of said lock.

* * * * *